(12) United States Patent
Kanda et al.

(10) Patent No.: US 10,356,488 B2
(45) Date of Patent: Jul. 16, 2019

(54) OUTPUT CONTROL SYSTEM, OUTPUT CONTROL METHOD, AND NON-TRANSITORY COMPUTER-READABLE RECORDING MEDIUM

(71) Applicant: CASIO COMPUTER CO., LTD., Tokyo (JP)

(72) Inventors: Hirokazu Kanda, Ome (JP); Akihito Iwadate, Fussa (JP); Shigekatsu Moriya, Tokyo (JP); Yuji Abe, Komae (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/478,350

(22) Filed: Apr. 4, 2017

(65) Prior Publication Data

US 2017/0366871 A1 Dec. 21, 2017

(30) Foreign Application Priority Data

Jun. 21, 2016 (JP) .................. 2016-122308

(51) Int. Cl.
*G06Q 30/02* (2012.01)
*H04L 29/06* (2006.01)
*H04N 21/81* (2011.01)
*H04N 21/239* (2011.01)
*H04N 21/442* (2011.01)
(Continued)

(52) U.S. Cl.
CPC ........... *H04N 21/812* (2013.01); *G06Q 30/02* (2013.01); *H04L 67/42* (2013.01); *H04N 21/2393* (2013.01); *H04N 21/23439* (2013.01); *H04N 21/2662* (2013.01); *H04N 21/2668* (2013.01); *H04N 21/44204* (2013.01); *H04N 21/47217* (2013.01); *H04N 21/647* (2013.01); *H04N 21/658* (2013.01); *H04N 21/6587* (2013.01)

(58) Field of Classification Search
CPC .. H04N 21/812; H04N 21/647; H04N 21/658; H04N 21/23439; H04N 21/2393; H04N 21/2662; H04N 21/2668; H04N 21/44204; H04N 21/47217; H04N 21/4784; H04N 21/6587; G06Q 20/00; G06Q 30/00; G06Q 725/23
See application file for complete search history.

(56) References Cited

U.S. PATENT DOCUMENTS

| | | | |
|---|---|---|---|
| 9,087,343 B2* | 7/2015 | Carr | ................. H04N 21/44222 |
| 2003/0172376 A1* | 9/2003 | Coffin, III | ............. G06Q 30/02 725/22 |

(Continued)

FOREIGN PATENT DOCUMENTS

JP 2011-150221 A 8/2011

*Primary Examiner* — Hai V Tran
(74) *Attorney, Agent, or Firm* — Scully Scott Murphy & Presser

(57) ABSTRACT

An output control system and the like that can control output of a content having a quality the user desires is provided. A client transmits a video content output request to a server. Receiving the output request from the client, the server transmits an advertising content to the client. The client transmits output information presenting the viewing time of the advertising content to the server. The server outputs to the client a video content having a quality corresponding to the viewing time presented by the acquired output information.

10 Claims, 10 Drawing Sheets

(51) Int. Cl.
  *H04N 21/472*      (2011.01)
  *H04N 21/647*      (2011.01)
  *H04N 21/658*      (2011.01)
  *H04N 21/2343*     (2011.01)
  *H04N 21/2662*     (2011.01)
  *H04N 21/2668*     (2011.01)
  *H04N 21/6587*     (2011.01)

(56) References Cited

U.S. PATENT DOCUMENTS

2013/0174191 A1* 7/2013 Thompson, Jr. ... G06Q 30/0207
                                                    725/23
2014/0075466 A1* 3/2014 Zhao ................ H04N 21/4784
                                                    725/23

* cited by examiner

FIG.3

VIDEO CONTENTS DB    122

| CONTENT ID : M1 | | |
|---|---|---|
| VIEWING RATE R(%) | IMAGE QUALITY | VIDEO CONTENT |
| 100 | 1080p | M1_1080p |
| 80≦R<100 | 720p | M1_720p |
| 50≦R<80 | 480p | M1_480p |
| 20≦R<50 | 360p | M1_360p |
| 0≦R<20 | 240p | M1_240p |

FIG.9

VIDEO CONTENTS DB 122a

| CONTENT ID : M1 | | |
|---|---|---|
| VIEWING RATE R(%) | VIDEO CONTENT | |
| | MAIN CONTENT | SUB-CONTENT (DETAILS) |
| 100 | M1_M | M1_S1 (LIVE IMAGE) |
| 80≦R<100 | M1_M | M1_S2 (PV) |
| 50≦R<80 | M1_M | M1_S3 (VIDEO IMAGE RELEVANT TO M1) |
| 20≦R<50 | M1_M | M1_S4 (VIDEO IMAGE IRRELEVANT TO M1) |
| 0≦R<20 | M1_M | M1_S5 (STILL IMAGE) |

OUTPUT CONTROL SYSTEM, OUTPUT CONTROL METHOD, AND NON-TRANSITORY COMPUTER-READABLE RECORDING MEDIUM

CROSS-REFERENCE TO RELATED APPLICATION

This application claims the benefit of Japanese Patent Application No. 2016-122308, filed on Jun. 21, 2016, the entire disclosure of which is incorporated by reference herein.

FIELD

This application relates generally to an output control system, output control method and non-transitory computer-readable recording medium for controlling output of contents.

BACKGROUND

In the prior art, there are systems providing contents to users by projecting the contents on a screen. For example, Unexamined Japanese Patent Application Kokai Publication No. 2011-150221 discloses a technique of projecting a content on a screen shaped into the contour of the content when a person is detected by a motion sensor.

SUMMARY

However, techniques as in the above publication can output a content according to the presence/absence of a user; however, output of a content is one-sided and it is difficult to reflect the user's desire on the quality of a content.

The present disclosure is made with the view of the above situation and an objective of the disclosure is to provide an output control device and the like that can control output of a content having a quality the user desires.

An output control system, comprising:
a display outputting a first content;
an acquirer acquiring output information regarding the first content output to the display; and
a CPU changing, to the display, output of a second content having a quality corresponding to the acquired output information.

The present disclosure makes it possible to control output of a content having a quality the user desires.

BRIEF DESCRIPTION OF THE DRAWINGS

A more complete understanding of this application can be obtained when the following detailed description is considered in conjunction with the following drawings, in which:

FIG. 3 is an illustration showing exemplary data saved in the video contents DB according to Embodiment 1;

FIG. 9 is an illustration showing exemplary data saved in the video contents DB according to Embodiment 2.

DETAILED DESCRIPTION

Embodiments of the present disclosure will be described below with reference to the drawings.

(Embodiment 1)

Figure 1:
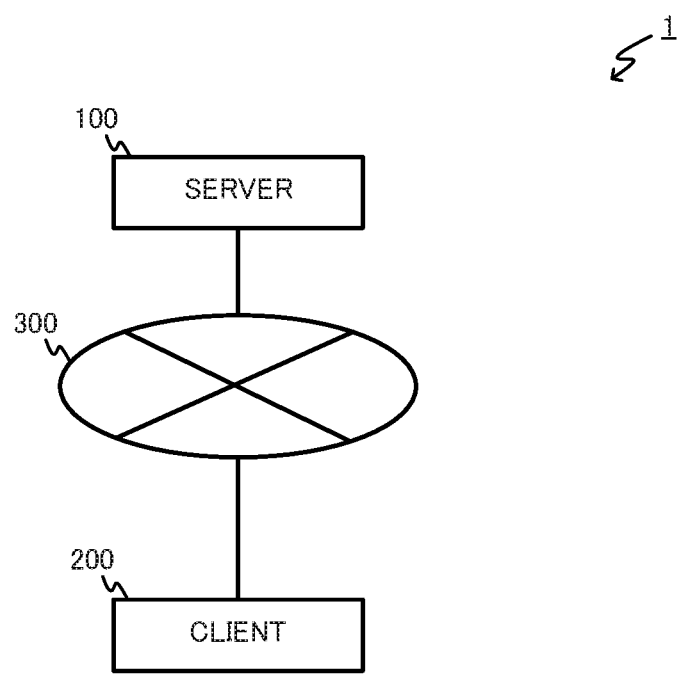
FIG. 1 is a diagram showing the general configuration of the output control system according to Embodiment 1.

FIG. 1 is a diagram showing the general configuration of an output control system 1 according to Embodiment 1 of the present disclosure. The output control system 1 is a system controlling output of contents the user views. As shown in FIG. 1, the output control system 1 comprises a server 100 and a client 200. The server 100 and the client 200 are communicably connected via a network 300 such as the Internet.

The server 100 and the client 200 are each an example of the output control device and the display according to the present disclosure, respectively. The server 100 outputs a content to the client 200 according to a request from the client 200. Acquiring from the client 200 output information regarding an advertising content output to the client 200, the server 100 outputs to the client 200 a video content having a quality corresponding to the output information.

The advertising content and the video content are each an example of the first content and the second content according to the present disclosure, respectively. The advertising content and the video content are each a content including sound and a screen image. The video content is a content the user of the client 200 desires to view. The advertising content is a content intended to advertise a product or service. The advertising content is a content that is output before the video content is output on the client 200 and can be skipped according to operation input by the user of the client 200.

The configuration of the server 100 will be described in detail next.

Figure 2:
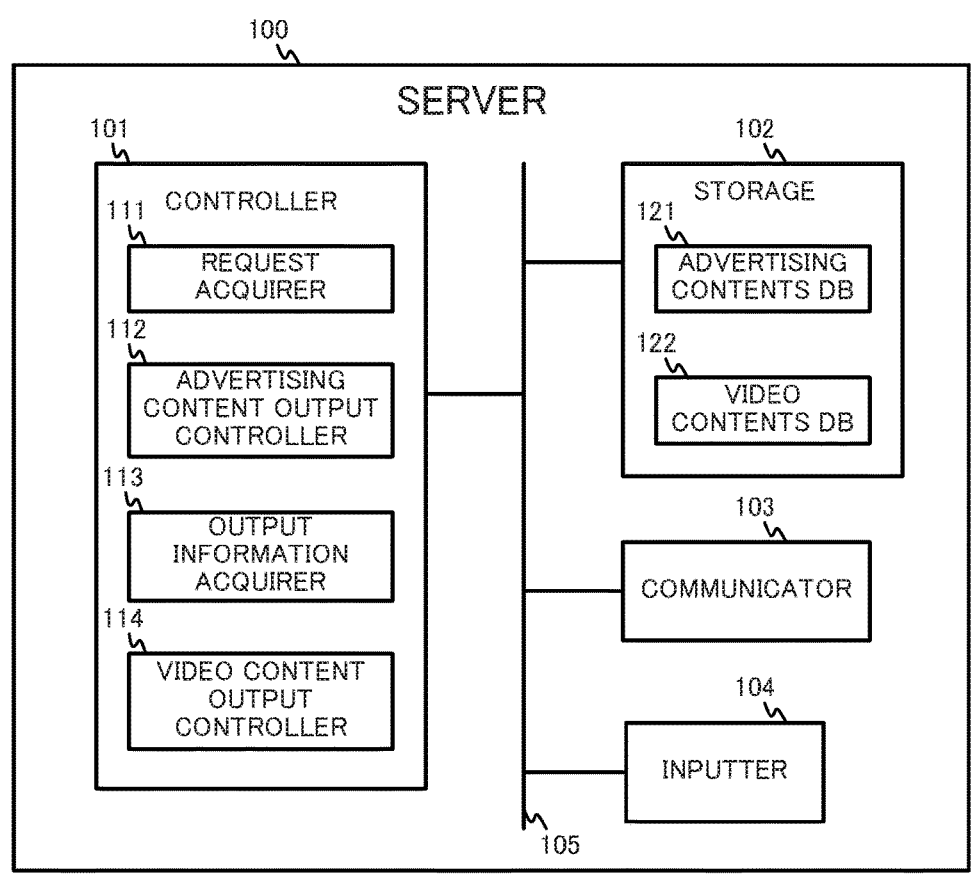
FIG. 2 is a schematic diagram showing the configuration of the server according to Embodiment 1.

FIG. 2 is a schematic diagram showing the configuration of the server 100. As shown in FIG. 2, the server 100 comprises a controller 101, a storage 102, a communicator 103, and an inputter 104. These parts are connected by a bus 105.

The controller 101 comprises a central processing unit (CPU), a read only memory (ROM), and a random access memory (RAM). The controller 101 executes programs (for example, programs regarding the server-side output control procedure described later) stored in the ROM to realize the functions of a request acquirer 111, an advertising content output controller 112, an output information acquirer 113, and a video content output controller 114, which are described later.

The storage 102 comprises a nonvolatile memory such as a hard disk drive (HDD). The storage 102 stores various contents to output to the client 200. The storage 102 stores an advertising contents database (DB) 121 and a video contents DB 122.

The advertising contents DB 121 saves advertising contents to output to the client 200. The advertising contents DB 121 may save multiple advertising contents or only one advertising content.

The video contents DB 122 saves video contents to output to the client 200. FIG. 3 shows exemplary data saved in the video contents DB 122. The video contents DB 122 shown in FIG. 3 saves multiple video contents identified with content identifications (IDs). Furthermore, each video content comprises video contents of multiple different image qualities. For example, a video content having a content ID "M1" comprises video contents "M1_1080p," "M1_720p," "M1_480p," "M1_360p," and "M1_240p" of which the image qualities are "1080p," "720p," "480p," "360p," and "240p," respectively. Here, the image qualities "1080p," "720p," "480p," "360p," and "240p" present the number of pixels "1920×1080," "1280×720," "854×480," "640×360," and "426×240," respectively; the higher the numeric value is, the higher the image quality is. Moreover, the higher the image quality is, the higher viewing rate each of the video contents of multiple different image qualities is associated with. Here, the viewing rate is the ratio of the time for which the user of the client 200 has viewed an advertising content to the time of the entire advertising content. For example, the video contents "M1_1080p," "M1_720p," "M1_480p," "M1_360p," and "M1_240p" having the content ID "M1" are associated with the viewing rates R "100," "80≤R<100," "50≤R<80," "20≤R<20," "0≤R<20."

Returning to FIG. 2, the communicator 103 comprises a communication interface for communicably connecting the server 100 to the client 200.

The inputter 104 comprises an input device such as buttons, a keyboard, or a touch panel. The inputter 104 receives operation input from the user of the server 100 and outputs signals corresponding to the received operation input to the controller 101.

The functional configuration of the controller 101 of the server 100 will be described next. As shown in FIG. 2, the controller 101 functions as a request acquirer 111, an advertising content output controller 112, an output information acquirer 113, and a video content output controller 114.

The request acquirer 111 acquires a video content output request from the client 200 via the communicator 103. For example, the output request includes the content ID of a video content the user of the client 200 desires to view.

As the request acquirer 111 acquires the output request, the advertising content output controller 112 controls output of an advertising content to the client 200. For example, as the request acquirer 111 acquires the output request, the advertising content output controller 112 transmits an advertising content saved in the advertising contents DB 121 to the client 200 via the communicator 103. Here, the advertising content output controller 112 may select an advertising content to transmit to the client 200 based on the content ID included in the output request acquired by the request acquirer 111 among the advertising contents saved in the advertising contents DB 121.

The output information acquirer 113 acquires output information regarding the advertising content output to the client 200. For example, the output information acquirer 113 acquires from the client 200 via the communicator 103 output information presenting the time for which the advertising content transmitted to the client 200 by the advertising content output controller 112 is viewed on the client 200 (the viewing time).

The video content output controller 114 controls output to the client 200 of a video content having a quality corresponding to the output information acquired by the output information acquirer 113. For example, the video content output controller 114 calculates a viewing rate of the advertising content from the viewing time presented by the output information acquired by the output information acquirer 113 and the total time of the advertising content transmitted by the advertising content output controller 112. Then, the video content output controller 114 selects, with reference to the video contents DB 122, a video content having a quality corresponding to the calculated viewing rate among the video contents identified with the content ID included in the output request acquired by the request acquirer 111. Then, the video content output controller 114 transmits the selected video content to the client 200 via the communicator 103.

For example, when the viewing time t presented by the output information acquired by the output information acquirer 113 is 15 seconds and the total time T of the advertising content transmitted by the advertising content output controller 112 is 60 seconds, the video content output controller 114 calculates a viewing rate of the advertising content R=100×t/T=100×15/60=25%. Then, when the content ID included in the output request acquired by the request acquirer 111 is "M1," the video content output controller 114 selects, with reference to the video contents DB 122, a video content "M1_360p" corresponding to the viewing rate R of 25% among the video contents having the content ID "M1." Then, the video content output controller 114 transmits the selected video content "M1_360p" to the client 200.

The configuration of the client 200 will be described in detail next.

Figure 4:
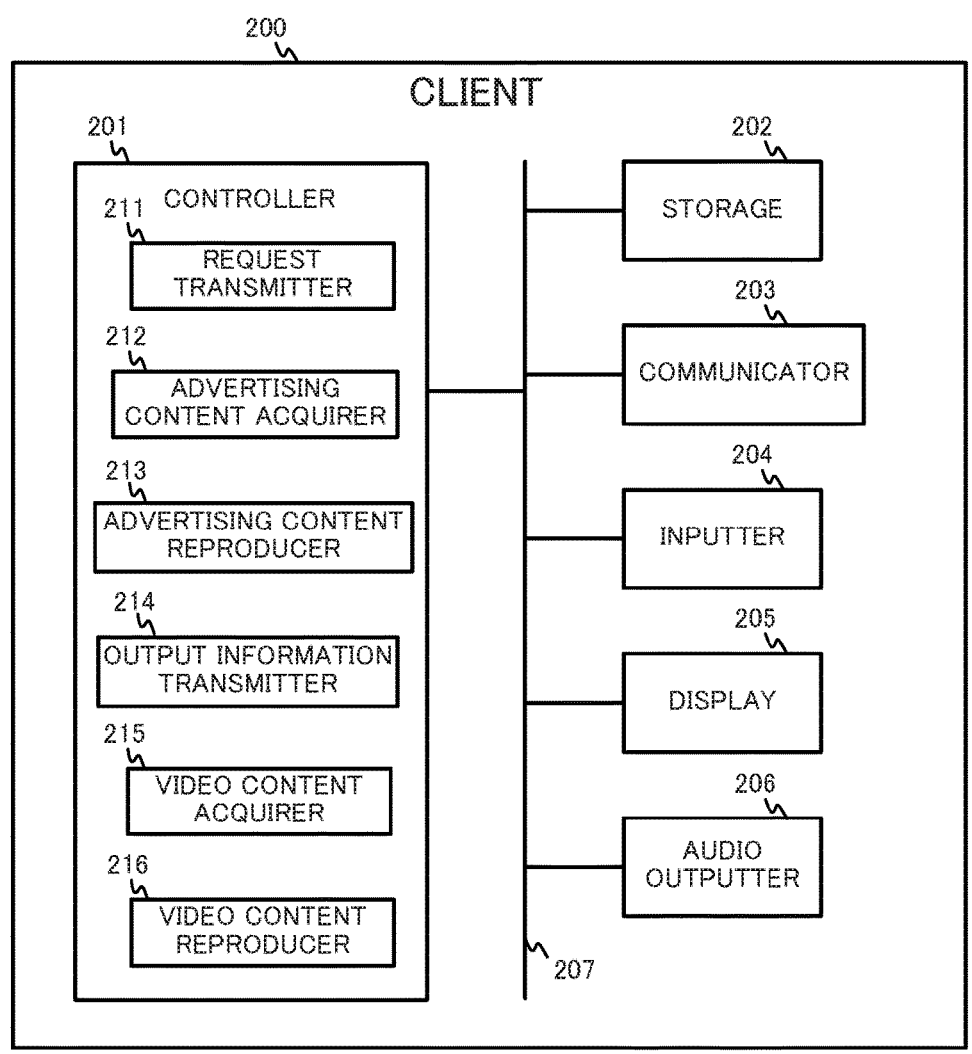
FIG. 4 is a schematic diagram showing the configuration of the client according to Embodiment 1.

FIG. 4 is a schematic diagram showing the configuration of the client 200. As shown in FIG. 4, the client 200 comprises a controller 201, a storage 202, a communicator 203, an inputter 204, a display 205, and an audio outputter 206. These parts are connected by a bus 207.

The controller 201 comprises a CPU, a ROM, and a RAM. The controller 201 executes programs (for example, programs regarding the client-side output control procedure described later) stored in the ROM to realize the functions of a request transmitter 211, an advertising content acquirer 212, an advertising content reproducer 213, an output information transmitter 214, a video content acquirer 215, and a video content reproducer 216, which are described later.

The storage 202 comprises a nonvolatile memory such as an HDD.

The communicator 203 comprises a communication interface for communicably connecting to the server 100.

The inputter 204 comprises an input device such as buttons, a keyboard, or a touch panel. The inputter 204 receives operation input from the user of the client 200 and outputs signals corresponding to the received operation input to the controller 201.

The display 205 is a device displaying a content output by the server 100, and comprises, for example, a liquid crystal display (LCD), an electroluminescence (EL) display, or a projector and a screen.

The audio outputter 206 is a device outputting audio data included in a content output by the server 100, and comprises, for example, a speaker.

The functional configuration of the controller 201 of the client 200 will be described next. As shown in FIG. 4, the controller 201 functions as a request transmitter 211, an advertising content acquirer 212, an advertising content reproducer 213, an output information transmitter 214, a video content acquirer 215, and a video content reproducer 216.

The request transmitter 211 transmits an output request for requesting output of a video content to the server 100 via the communicator 203. For example, receiving operation input requesting output of a video content the user desires from the inputter 204, the request transmitter 211 transmits an output request including the content ID of the video content to the server 100 via the communicator 203.

The advertising content acquirer 212 acquires an advertising content from the server 100 via the communicator 203.

The advertising content reproducer 213 outputs the advertising content acquired by the advertising content acquirer 212 to the display 205 and the audio outputter 206. Moreover, the advertising content reproducer 213 measures the viewing time of the advertising content. For example, the advertising content reproducer 213 measures, as the viewing time, the time until a skip operation is received from the user via the inputter 204 since the advertising content is reproduced, or the time of the entire advertising content if no skip operation is received before reproduction of the entire advertising content is over.

The output information transmitter 214 transmits to the server 100 output information regarding the advertising content reproduced by the advertising content reproducer 213. For example, the output information transmitter 214 transmits to the server 100 via the communicator 203 output information presenting the viewing time measured by the advertising content reproducer 213.

The video content acquirer 215 acquires a video content from the server 100 via the communicator 203.

The video content reproducer 216 outputs the video content acquired by the video content acquirer 215 to the display 205 and the audio outputter 206.

Figure 5:
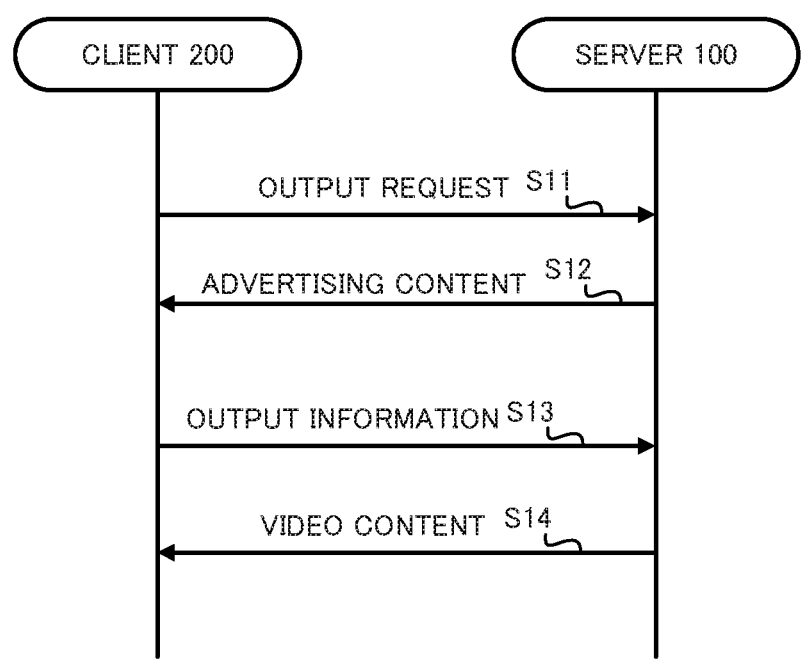
FIG. 5 is a sequence chart showing an exemplary control flow between the server and the client.

The control flow between the server 100 and the client 200 will be described next using the sequence chart shown in FIG. 5.

First, receiving operation input requesting output of a video content, the client 200 transmits an output request to the server 100 (Step S11).

Receiving the output request from the client 200, the server 100 transmits an advertising content to the client 200 (Step S12).

Receiving the advertising content from the server 100, the client 200 starts reproducing the received advertising content. Then, the client 200 transmits output information presenting the viewing time of the advertising content to the server 100 when a skip operation on the advertising content is received or reproduction of the entire advertising content is over (Step S13).

Receiving the output information from the client 200, the server 100 transmits to the client 200 a video content having a quality corresponding to the viewing time presented by the received output information (Step S14). The client 200 receives from the server 100 and reproduces the video content.

Figure 6:
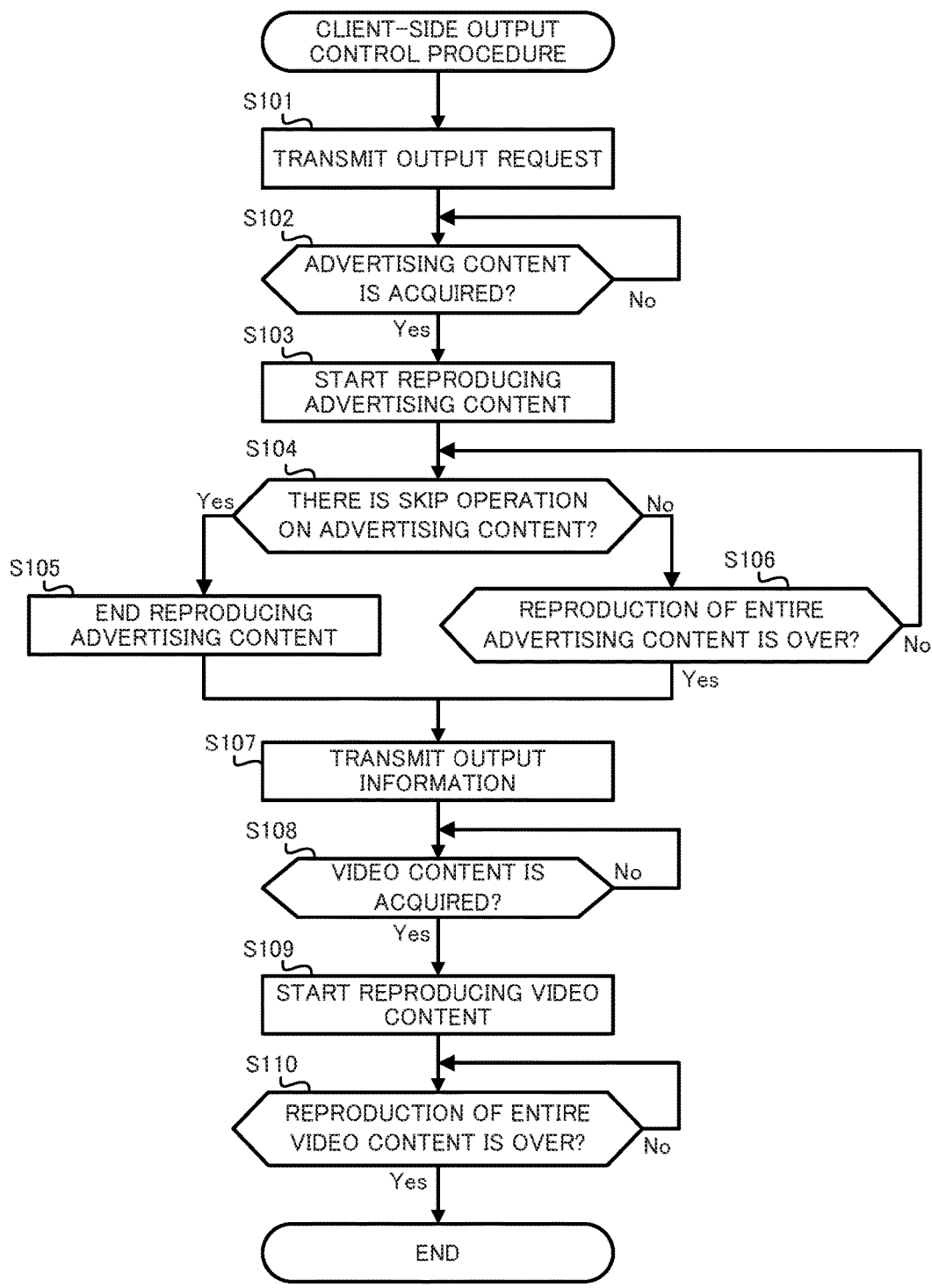
FIG. 6 is an exemplary flowchart of the client-side output control procedure according to Embodiment 1.

The client-side output control procedure executed by the controller 201 of the client 200 according to this Embodiment 1 will be described next. FIG. 6 is an exemplary flowchart of the client-side output control procedure according to this Embodiment 1. Triggered by, for example, reception of operation input requesting output of a video content the user desires from the user via the inputter 204, this client-side output control procedure starts.

First, the request transmitter 211 transmits an output request including the content ID of a video content the user desires to the server 100 (Step S101).

Next, the advertising content acquirer 212 judges whether an advertising content is acquired from the server 100 (Step S102). The advertising content acquirer 212 waits until an advertising content is acquired from the server 100 (Step S102; No).

If the advertising content acquirer 212 judges that an advertising content is acquired from the server 100 (Step S102; Yes), the advertising content reproducer 213 starts reproducing the acquired advertising content by outputting the advertising content to the display 205 and the audio outputter 206 (Step S103). Moreover, the advertising content reproducer 213 starts measuring the viewing time using a timer or the like along with reproduction of the advertising content.

Next, the advertising content reproducer 213 judges whether a skip operation on the advertising content is received from the user via the inputter 204 (Step S104).

If judged that a skip operation on the advertising content is received from the user (Step S104; Yes), the advertising content reproducer 213 ends reproducing the advertising content (Step S105). Moreover, the advertising content reproducer 213 ends measuring the viewing time and acquires as the viewing time the time measured until the skip operation is received since the advertising content is reproduced.

If judged that no skip operation on the advertising content is received from the user (Step S104; No), the advertising content reproducer 213 judges whether reproduction of the entire advertising content is over (Step S106).

If judged that reproduction of the entire advertising content is not over (Step S106; No), the advertising content reproducer 213 returns to the Step S104 and repeats the processing. On the other hand, if judged that reproduction of the entire advertising content is over (Step S106; Yes), the advertising content reproducer 213 ends measuring the viewing time and acquires the time of the entire advertising content as the viewing time.

Next, the output information transmitter 214 transmits to the server 100 output information presenting the viewing time acquired by the advertising content reproducer 213 (Step S107).

Next, the video content acquirer 215 judges whether a video content is acquired from the server 100 (Step S108). The video content acquirer 215 waits until a video content is acquired (Step S108; No).

If the video content acquirer 215 acquires a video content (Step S108; Yes), the video content reproducer 216 starts reproducing the acquired video content by outputting the video content to the display 205 and the audio outputter 206 (Step S109).

Then, the video content reproducer 216 judges whether reproduction of the entire video content is over (Step S110). The video content reproducer 216 waits until reproduction of the entire video content is over (Step S110; No). On the other hand, if judged that reproduction of the entire video content is over (Step S110; Yes), the video content reproducer 216 ends this procedure.

Figure 7:
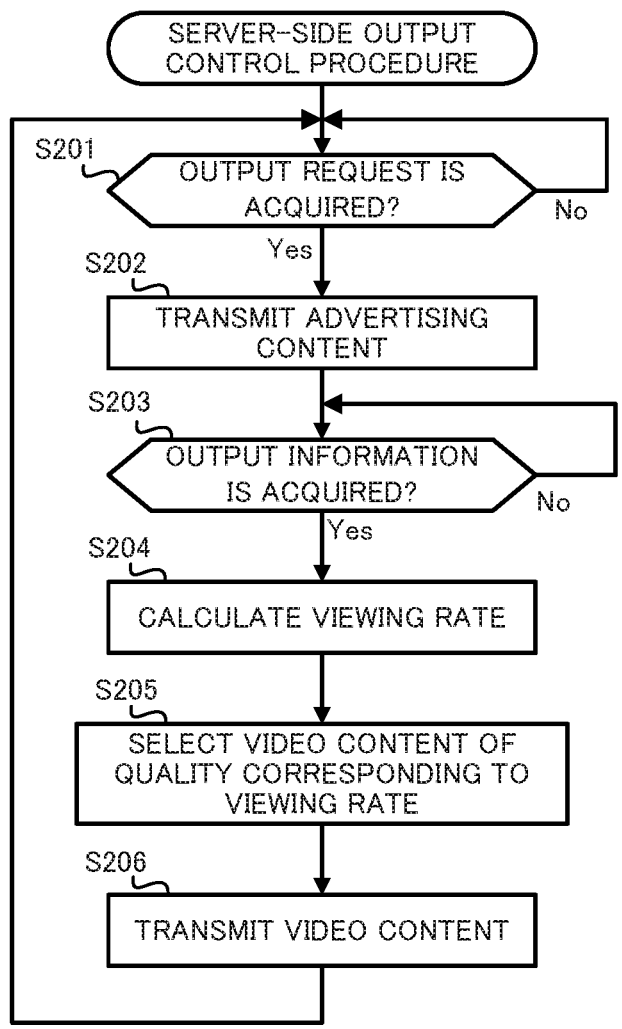
FIG. 7 is an exemplary flowchart of the server-side output control procedure according to Embodiment 1.

The server-side output control procedure executed by the controller 101 of the server 100 according to this Embodiment 1 will be described next. FIG. 7 is an exemplary flowchart of the server-side output control procedure according to this Embodiment 1. Triggered by, for example, the server 100 being powered on, this server-side output control procedure starts.

The request acquirer 111 judges whether an output request is acquired from the client 200 (Step S201). The request acquirer 111 waits until an output request is acquired from the client 200 (Step S201; No).

If the request acquirer 111 judges that an output request is acquired (Step S201; Yes), the advertising content output controller 112 transmits an advertising content to the client 200 (Step S202).

Next, the output information acquirer 113 judges whether output information is acquired from the client 200 (Step S203). The output information acquirer 113 waits until output information is acquired from the client 200 (Step S203; No).

If the output information acquirer 113 judges that output information is acquired (Step S203; Yes), the video content output controller 114 calculates a viewing rate of the advertising content based on the viewing time presented by the acquired output information and the time of the entire advertising content transmitted in the Step S202 (Step S204).

Then, the video content output controller 114 selects, with reference to the video contents DB 122, a video content having a quality corresponding to the viewing rate calculated in the Step S204 among the video contents having the content ID included in the output request acquired in the Step S201 (Step S205).

Then, the video content output controller 114 transmits the video content selected in the Step S205 to the client 200 (Step S206). Then, the controller 101 returns to the Step S201 and repeats the above-described processing.

As descried above, the server 100 according to this Embodiment 1 outputs to the client 200 a video content having an image quality corresponding to the viewing time of an advertising content. Therefore, the user can view a video content having an image quality the user desires. For example, the user can view a video content having a higher quality as the user view an advertising content for a longer time. Moreover, the user can skip an advertising content when he does not desire to view the advertising content.

(Embodiment 2)

The server 100 according to the above Embodiment 1 is described in regard to the case of controlling output of video contents different in image quality as the quality. In this Embodiment 2, the case in which a video content includes a main content and a sub-content and the server 100 controls output of a video content including a sub-content having a quality corresponding to the output information is described. Here, the same components as in Embodiment 1 are referred to by the same reference numbers and their detailed explanation is omitted.

Figure 8:
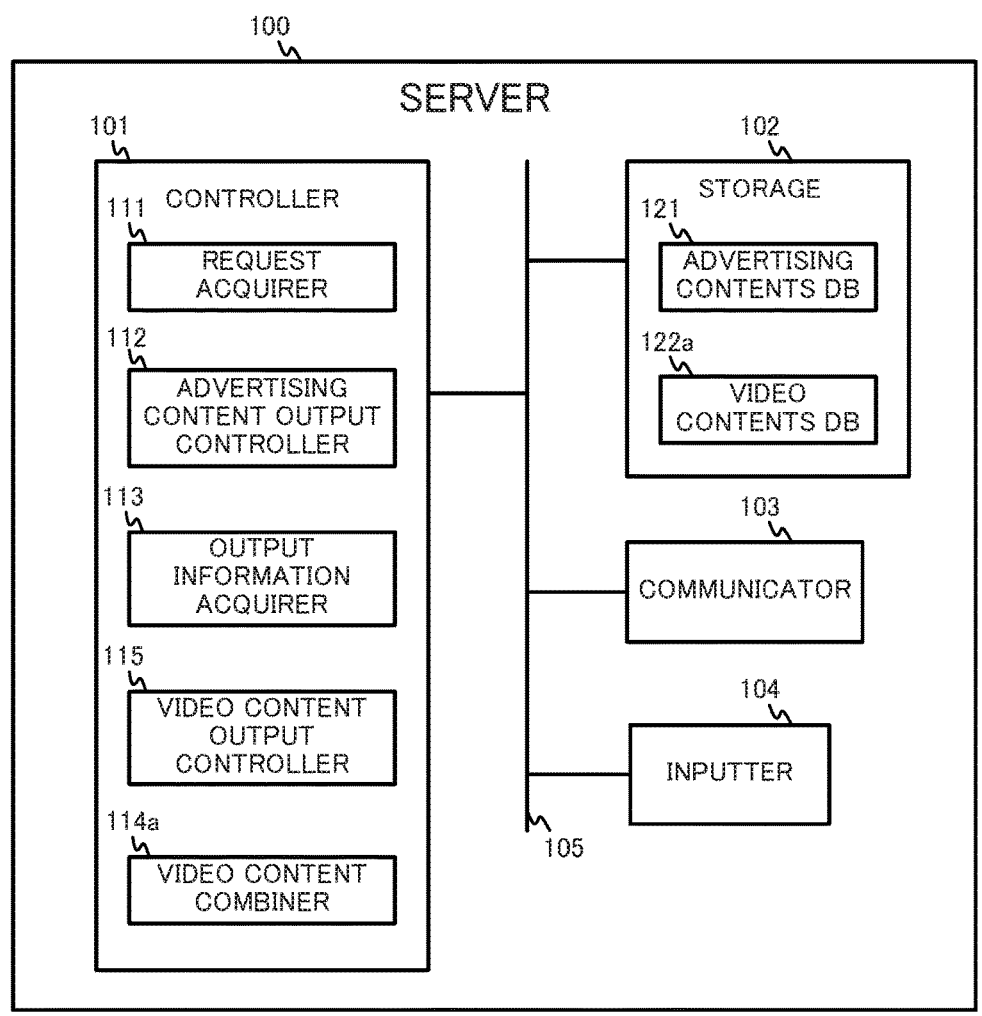
FIG. 8 is a schematic diagram showing the configuration of the server according to Embodiment 2.

FIG. 8 shows the configuration of the server 100 according to this Embodiment 2. As shown in FIG. 8, the storage 102 according to Embodiment 2 saves a video contents DB 122a instead of the video contents DB 122 in Embodiment 1. Moreover, the controller 101 according to Embodiment 2 further functions as a video content combiner 115 and functions as a video content output controller 114a in place of the video content output controller 114 in Embodiment 1.

The video contents DB 122a saves video contents including main contents and sub-contents. Here, the main contents are contents necessary for the user to achieve the main purpose by viewing a video content. On the other hand, the sub-contents are contents accompanying the main contents.

FIG. 9 shows exemplary data saved in the video contents DB 122a. The video contents DB 122a shown in FIG. 9 saves multiple video contents identified with contents IDs. Here, the video contents according to this Embodiment 2 are contents reproduced when the user sings karaoke and comprising a main content including words displayed in time with the karaoke sound and sub-contents of multiple different qualities that include a screen image displayed as the background of the karaoke sound and words. For example, a video content having a content ID "M1" comprises a main content "M1_M" and sun-contents "M1_S1," "M1_S2," "M1_S3," "M1_S4," and "M1_S5" of different qualities.

Here, the sub-content "M1_S1" is a content including a live image of the video content having the content ID "M1." Moreover, the sub-content "M1_S2" is a content including a promotion video (PV) of the video content having the content ID "M1." Moreover, the sub-content "M1_S3" is a content including a video image relevant to the video content having the content ID "M1." Moreover, the sub-content "M1_S4" is a content including a video image irrelevant to the video content having the content ID "M1." Moreover, the sub-content "M1_S5" is a content including a still image. Here, it is assumed that the qualities of the sub-contents are in the order of, from high to low, "M1_S1," "M1_S2," "M1_S3," "M1_S4," and "M1_S5." Moreover, the higher the quality is, the higher viewing rate each of the sub-contents having multiple different qualities is associated with.

Returning to FIG. 8, the video content combiner 115 creates a video content by combining a sub-content having a quality corresponding to the output information acquired by the output information acquirer 113 and a main content. For example, the video content combiner 115 calculates a viewing rate of the advertising content from the viewing time presented by the output information acquired by the output information acquirer 113 and the total time of the advertising content transmitted by the advertising content output controller 112 as the video content output controller 114 in Embodiment 1 does. Then, the video content combiner 115 selects, with reference to the video contents DB 122a, a sub-content having a quality corresponding to the calculated viewing rate among the video contents identified with the content ID included in the output request acquired by the request acquirer 111. Then, the video content combiner 115 combines the selected sub-content and the main content to create a video content to output to the client 200.

For example, when the content ID included in the output request is "M1" and the viewing rate is 25%, the video content combiner 115 selects, with reference to the video contents DB 122a, a sub-content "M1_S4" corresponding to the viewing rate R of 25% among the video contents having the content ID "M1." Then, the video content combiner 115 combines the selected sub-content "M1_S4" and the main content "M1_M" to create a video content to output to the client 200. In other words, the video content created here is a content displaying the words in time with the karaoke sound of the video content having the content ID "M1" with a video image irrelevant to the video content having the content ID "M1" in the background.

The video content output controller 114a transmits the video content created by the video content combiner 115 to the client 200 via the communicator 103.

Figure 10:
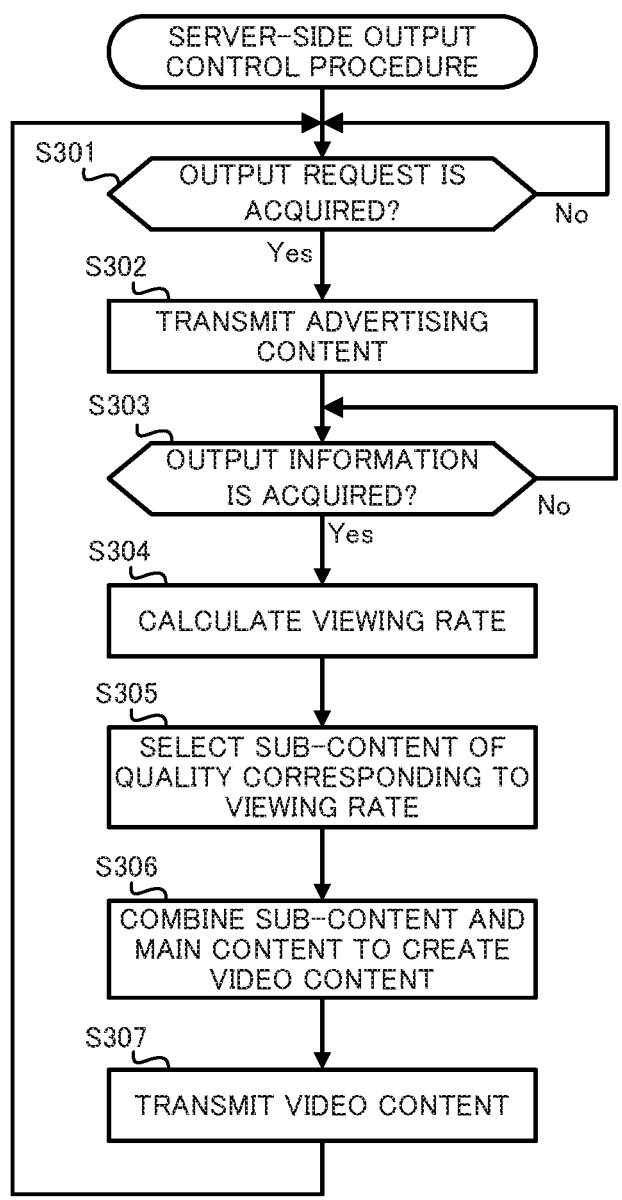
FIG. 10 is an exemplary flowchart of the server-side output control procedure according to Embodiment 2.

The server-side output control procedure executed by the controller 101 of the server 100 according to this Embodiment 2 will be described next. FIG. 10 is an exemplary flowchart of the server-side output control procedure according to this Embodiment 2. Triggered by, for example, the server 100 being powered on, this server-side output control procedure starts.

First, in Steps S301 to S304, the controller 101 executes the same processing as in the Steps S201 to S204 of the server-side output control procedure according to Embodiment 1 shown in FIG. 7.

Then, the video content combiner 115 selects, with reference to the video contents DB 122a, a sub-content having a quality corresponding to the viewing rate calculated in the Step S304 among the video contents having the content ID included in the output request acquired in the step S301 (Step S305).

Next, the video content combiner 115 combines the main content of the video content having the content ID included in the output request acquired in the Step S301 and the sub-content selected in the Step S305 to create a video content (Step S306).

Then, the video content output controller 114a transmits the video content created in the Step S306 to the client 200 (Step S307). Then, the controller 101 returns to the Step S301 and repeats the above-described processing.

As described above, the server 100 according to this Embodiment 2 controls output of a video content including a main content and a sub-content having a quality corresponding to the output information. Therefore, the server 100 can output a sub-content having a quality corresponding to the user's desire while maintaining the quality of the main content necessary for the user to achieve the main purpose by viewing the video content.

Embodiments are described above. The above-described embodiments are given by way of example and the specific configuration of the output control system 1 and the details of the server-side output control procedure and client-side output control procedure are not confined to those described in the above embodiments and can be modified as follows.

For example, in Embodiments 1 and 2, a case is described in which the output control system 1 comprises the server 100 and the client 200 connected to the server 100 via the network 300. However, the server 100 may be integrated with the client 200. In other words, the output control device according to the present disclosure may comprise the functions of both the server 100 and the client 200. Moreover, the output control device according to the present disclosure may comprise only the function of the client 200. In such a case, the display 205 and the audio outputter 206 of the client 200 function as the display according to the present disclosure.

Moreover, in Embodiments 1 and 2, a case is described in which the first content and the second content according to the present disclosure are an advertising content and a video content each including sound and a screen image. However, the first content and the second content are not confined to these examples. For example, the first content and the second content may be a content including either of sound and a screen image. Moreover, the first content and the second content may be a content including a still image. Moreover, the first content and the second content may be webpages. In such a case, the client 200 can acquire output information presenting the browsing time of a webpage that is the first content. Then, the server 100 determines the amount of information on a webpage that is the second content to output to the client 200 according to the browsing time presented by the output information. For example, the server 100 may output as the second content a webpage including only summaries of articles to the client 200 when the browsing time is shorter than a given threshold. Moreover, the server 100 may output as the second content a webpage including whole articles to the client 200 when the browsing time is equal to or longer than a given threshold.

Moreover, in Embodiments 1 and 2, a case is described in which the client 200 transmits to the server 100 output information presenting the viewing time of an advertising content and the server 100 calculates the viewing rate of the advertising content based on the output information acquired from the client 200. However, the client 200 may calculate the viewing rate of the advertising content based on the viewing time of the advertising content and transmit output information presenting the calculated viewing rate to the server 100.

Moreover, in Embodiments 1 and 2, a case is described in which the server 100 calculates the viewing rate of the advertising content based on the viewing time presented by the output information and outputs to the client 200 a video content having a quality corresponding to the calculated viewing rate. However, the server 100 may associate and retain in the video contents DB 122 or 122a viewing times of advertising contents and video contents of multiple different qualities instead of the viewing rates of advertising contents. In such a case, the server 100 can output to the client 200 a video content having a quality corresponding to the viewing time presented by the output information without calculating the viewing rate of the advertising content.

Moreover, in Embodiment 1, a case is described in which the server 100 determines the image quality of a video content to output to the client 200 according to the output information. However, the quality of the second content the server 100 determines according to the output information is not confined thereto. For example, the server 100 may determine the sound quality, volume, file format, and compression means of the second content to output to the client 200 according to the output information.

Moreover, in Embodiment 2, a case is described in which the video content combiner 115 of the server 100 combines a sub-content having a quality corresponding to the output information acquired by the output information acquirer 113 and a main content to create a video content. However, the server 100 may pre-retain video contents that are combinations of a sub-content having a quality varied for each viewing rate and a main content in the video contents DB 122a. In such a case, the server 100 can acquire from the video contents DB 122a a video content including a sub-content having a quality corresponding to the viewing rate presented by the output information and output the video content to the client 200.

Moreover, the server 100 and the client 200 according to the present disclosure can be realized by a conventional computer, not by a dedicated device. For example, the server 100 and the client 200 may be realized by a computer executing programs. The programs for realizing the functions of the server 100 and the client 200 may be stored on a non-transitory computer-readable recording medium such as a universal serial bus (USB) memory, a compact disc read only memory (CD-ROM), a digital versatile disc (DVD), and an HDD, or downloaded on a computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An output control system comprising:
   a CPU configured to:
      access a storage configured to store:
         a first content; and
         second contents of different qualities,
            wherein each of the different qualities of the second contents corresponds to one of a plurality of viewing rates of the first content;

control a communication interface to transmit the first content to an output device for presentation of the first content;

control the communication interface to receive output information indicating viewing rate of the first content based on an operation input by a user from the output device;

select, with reference to the storage, one of the second contents having a quality corresponding to the viewing rate of the first content indicated by the output information received; and control the communication interface to transmit content comprising the one of the second contents selected to the output device for presentation of the one of the second contents selected, wherein the viewing rate of the first content according to the operation input by the user is calculated as a period of time since the first content is reproduced until a skip operation is received as the operation input by the user relative to the total time of the first content.

2. The output control system according to claim 1,
wherein the output device is a display device and the first content and second contents are content that can be displayed by the display device, and
wherein the output information indicates a consumption time representing a time duration for which the display device is controlled by a user to display the first content on the display device.

3. The output control system according to claim 2,
wherein a first one of the second contents is of a first image quality and a second one of the second contents is of a second image quality lower than the first image quality, and
wherein the first image quality of the first one of the second contents corresponds to a first consumption time indicated by the output information and the second image quality of the second one of the second contents corresponds to a second consumption time that is less than the first consumption time.

4. The output control system according to claim 3,
wherein the first image quality is a first pixel number of the first one of the second contents, and the second image quality is a second pixel number of the second one of the second contents.

5. The output control system according to claim 1,
wherein the second contents are of different image qualities, and each of the different image qualities of the second contents corresponds to one of a plurality of consumption times of the first content, and
wherein the CPU is configured to select one of the second contents having an image quality corresponding to the consumption time of the first content indicated by the output information received.

6. The output control system according to claim 1,
wherein the content to be transmitted to the output device comprises a main content and the one of the second contents selected.

7. The output control system according to claim 1,
wherein the first content and the second contents are each one or more of a sound content and a visual content.

8. The output control system according to claim 1,
wherein the different qualities of the second contents comprise one or more of:
different sound qualities;
different volumes;
different file formats; and
different compression means.

9. An output control method comprising:
accessing a storage configured to store:
a first content; and
second contents of different qualities,
wherein each of the different qualities of the second contents corresponds to one of a plurality of viewing rates of the first content;
controlling a communication interface to transmit the first content to an output device for presenting the first content;
controlling the communication interface to receive output information indicating viewing rate of the first content based on an operation input by a user from the output device;
selecting, with reference to the storage, one of the second contents having a quality corresponding to the viewing rate of the first content indicated by the output information received; and
controlling the communication interface to transmit content comprising the one of the second contents selected to the output device for presenting the one of the second contents selected,
wherein the viewing rate of the first content according to the operation input by the user is calculated as a period of time since the first content is reproduced until a skip operation is received as the operation input by the user relative to the total time of the first content.

10. A non-transitory computer-readable recording medium storing instructions that cause a computer to at least:
access a storage configured to store:
a first content; and
second contents of different qualities,
wherein each of the different qualities of the second contents corresponds to one of a plurality of viewing rates of the first content;
control a communication interface to transmit the first content to an output device for presentation of the first content;
control the communication interface to receive output information indicating viewing rate of the first content based on an operation input by a user from the output device;
select, with reference to the storage, one of the second contents having a quality corresponding to the viewing rate of the first content indicated by the output information received; and
control the communication interface to transmit content comprising the one of the second contents selected to the output device for presentation of the one of the second contents selected,
wherein the viewing rate of the first content according to the operation input by the user is calculated as a period of time since the first content is reproduced until a skip operation is received as the operation input by the user relative to the total time of the first content.

* * * * *